3,080,422
QUASIPHOSPHONIUM COMPOUNDS
Irving I. Bezman, Pittsburgh, and Janet H. Smalley, Irwin, Pa., assignors to Armstrong Cork Company, Lancaster, Pa., a corporation of Pennsylvania
No Drawing. Filed June 16, 1961, Ser. No. 117,518
4 Claims. (Cl. 260—551)

This invention is directed to a new composition of matter and more particularly is directed to quasiphosphonium compounds of the formula:

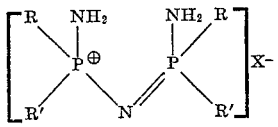

In this formula X is an anion and R and R' are members selected from the class consisting of a phenyl radical and a substituted phenyl radical.

The compounds of this invention are hydrolytically stable, produced in high yields by a simple reaction, and are useful starting materials in the synthesis of cyclic phosphonitriles of the formula $(RR'PN)_n$, which in turn are of increasing practical importance in that they appear to offer exceptional thermal and chemical stability at elevated temperatures.

This invention is based upon the reaction product formed by treating a solution of diphenyl phosphorus trichloride with an excess of anhydrous gaseous ammonia at room temperature. The compound thus formed is readily isolated by removing the solvent, and separating the ammonium chloride by-product of the reaction by simply washing with water in which the compound is both insoluble and stable. The product is formed in accordance with the following equation:

$$2(C_6H_5)_2PCl_3 + 8NH_3 \rightarrow (C_6H_5)_4P_2N_3H_4Cl + 5NH_4Cl$$

The products of this invention can be synthesized from a variety of disubstituted pentavalent phosphorus trihalides reacted with ammonia. The disubstituted pentavalent phosphorus trihalides are of the formula $RR'PX_3$ wherein R and R' are carbon containing groups attached to the phosphorus atom by a carbon-phosphorus bond. The groups are restricted insofar as they contain no components which are reactive with ammonia under the conditions used for synthesis of the novel products of this invention and the groups can be either the same or dissimilar. More specifically, R and R' are preferably members selected from the class consisting of a phenyl radical and a substituted phenyl radical of the formula

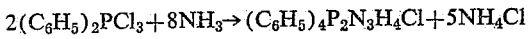

where Y is a radical selected from the group consisting of methyl, methoxy, cyano, thiocyano, isothiocyano, dialkyl amine having 1 to 4 carbon atoms in the alkyl groups, nitro and halogen and $n$ is an integer from 1 to 5. Thus, examples of R and R' are chlorophenyl, di-methylaminophenyl, di-butylaminophenyl, tolyl, cyanophenyl, fluorophenyl and dinitrophenyl.

In forming the compounds of this invention, the disubstituted pentavalent phosphorus halide is dissolved in a nonreactive organic solvent which reacts neither with ammonia nor with the disubstituted pentavalent phosphorus trihalide under the conditions of the reaction. Suitable solvents for use in the practice of this invention are: chloroform, anhydrous tetrachloroethane, and carbon tetrachloride. The solution of the disubstituted pentavalent phosphorus halide is reacted with an excess of gaseous anhydrous ammonia at approximately room temperature, although temperatures in the range of from about 0°–60° C. may be used, by introducing the gaseous ammonia into a suitable reaction vessel containing the pentavalent phosphorus halide in the organic solvent, the reaction preferably being carried out under a blanket of inert gas. To insure intimate mixing of the reactants, the solvent solution is preferably stirred throughout the reaction with the ammonia introduced through a sintered glass gas diffuser tube. The reaction as carried out requires only 4 moles of ammonia per mole of disubstituted phosphorus halide and preferably an excess of between 4–6 moles of gaseous ammonia is used to insure rapid completion of the reaction. By passing the gaseous ammonia into a homogeneous solution of the disubstituted phosphorus halide, reaction occurs instantaneously.

The reaction product formed by the reaction between the anhydrous gaseous ammonia and the disubstituted pentavalent phosphorus halide is a stable compound of the empirical formula $R_2R'_2P_2N_3H_4X$, which, together with the ammonium halide by-product, is readily filtered off from the reaction medium. The ammonium halide by-product formed during the reaction and separated by filtering is readily washed from the stable compound with cold, distilled water. A further quantity of the stable compound is obtained by evaporation of the organic solvent.

The structure of the products of this invention is predicated on the following experimental data for the compound $(C_6H_5)_4P_2N_3Cl$ resulting from the action of ammonia on diphenylphosphorus trichloride.

(a) The empirical formula is based on a complete chemical analysis.

(b) The molecular weight of the compound, determined by ebulliometric measurements in chloroform, a nonionizing solvent, shows the empirical and molecular formulas to be identical.

(c) The molecular weight of the compound, determined by ebulliometric measurements in methanol, an ionizing solvent, is substantially lower than that in chloroform, indicating ionization.

(d) Conductivity measurements made on dilute solutions of the compound in methanol indicate the compound conducts; the limiting equivalent conductance, $\Lambda_o$, is approximately 90; and the conductivity as a function of solution concentration is typical of a uni-univalent electrolyte.

(e) The chlorine atom of the compound can be easily replaced by various anions. Thus, when silver nitrate is added to the compound (each in methanol solution) a white precipitate of silver chloride forms immediately. The chlorine atom can be replaced by a picrate group by heating a solution of the compound and picric acid in ethanol. The chlorine atom can also be replaced by bromine through use of ion-exchange resins.

The above findings show the compound to be a salt of the following structure:

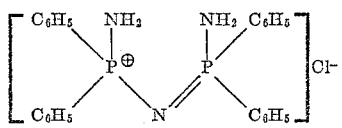

In according with modern knowledge concerning resonance and tautomeric equilibria, the quasiphosphonium salt structure shown above can exist in equilibrium with resonance and tautomeric variations, such variations evolving only from shifting of electrons or protons. Illustrative of these are the following:

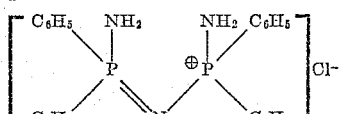 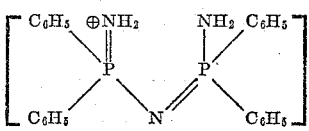 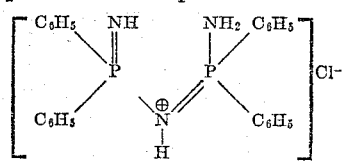

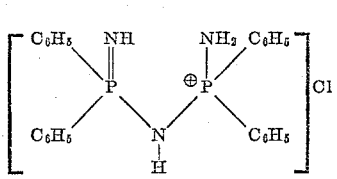 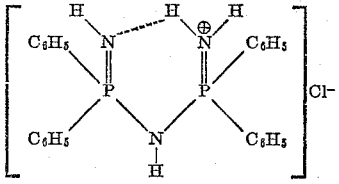

From this it can be seen that the compound, although referred to as a quasiphosphonium salt can also be formulated as an ammonium salt variation. The various possible resonance and tautomeric forms are construed to be within the scope of this invention.

Since the chlorine atom in the compound $(C_6H_5)_4P_2N_3H_4Cl$ is essentially in an ionic state, it readily undergoes ion conversion reactions similar to those demonstrated by typical quaternary phosphonium compounds. By treatment of the quasiphosphonium chloride with a salt, acid, or base, the negative chloride ion can be replaced by a variety of anions. Illustrative examples of anions which might be used are: picrate, bromide, fluoride, iodide, sulfate, nitrate, acetate, carbonate, hydroxide, and ethoxide.

The following examples will serve to illustrate the invention more fully:

*Example 1*

Diphenyl phosphorus trichloride was made by treating a carbon tetrachloride solution of diphenylchlorophosphine with gaseous chlorine. A solution of the resultant disphenylphosphorus trichloride (0.0754 mole, 22 grams) in 500 ml. of purified chloroform was treated at room temperature with 0.453 mole of gaseous ammonia which had been previously dried with sodium. The ammonia was introduced into the reaction vessel through a sintered glass gas diffuser tube, and it reacted immediately on contact with the solution. A stream of dry nitrogen was used to blanket the reaction system, and a magnetic stirrer was used for mixing. The heterogeneous solid reaction product was filtered off and washed with cold, distilled water to remove 9.9 grams (0.185 mole) of ammonium chloride and leave 10.1 grams of a white crystalline solid, melting at 251°–259° C. Evaporation of the remaining chloroform solution gave 8.7 grams of white crystals melting at 215°–230° C. Infrared characteristics of these fractions showed them to be identical. The compound exhibited unexpected stability in that it gave no evidence of hydrolysis either on atmospheric exposure or during ammonium chloride removal. The fractions were combined, recrystallized from chloroform, and dried at 100° C. under 10 mm. Hg pressure to give 13.9 grams of a compound melting at 251°–254° C. There was evidence that the compound forms a 1:1 adduct with chloroform, the adduct readily decomposing on heating or on recrystallization from methanol. One recrystallization from methanol gave the analytical sample, M.P. 245.0°–246.5° C.

*Analysis.*—Calcd. for $C_{24}H_{24}P_2N_3Cl$: C, 63.78; H, 5.35; N, 9.30; Cl, 7.85; and P, 13.71. Found: C, 64.00; H, 5.46; N, 9.56; Cl, 8.32; and P, 12.79%. Molecular weight (ebulliometric measurements) in chloroform, 455; in methanol, 230; calculated for $C_{24}H_{24}P_2N_3Cl$, 452. On the basis of the above formula, the product yield was 82%. Repeated reactions gave the same compound in similar high yield.

*Example 2*

A typical procedure for replacement of the chlorine atom by another negative ion is as follows: To 100 ml. of absolute ethanol is added 1.36 grams (0.003 mole) of $(C_6H_5)_4P_2N_3H_4Cl$ and 0.69 gram (0.003 mole) of $(NO_2)_3(C_6H_2)OH$. The resulting mixture is boiled to a volume of 10 ml. and allowed to cool. The yellow crystals which precipitate from solution are collected on a filter and washed with 50% ethanol. One recrystallization of the crude picrate, $(C_6H_5)_4P_2N_3H_4O(C_6H_2)(NO_2)_3$ from absolute ethanol gave the analytical sample, M.P. 154.5–155.5 (Fisher-Johns melting point block).

*Analysis.*—Calcd. for $C_{30}H_{26}P_2N_6O_7$: P, 9.61; N, 13.04; Cl, 0.00. Found: P, 9.32; N. 13.46; Cl, 0.00.

*Example 3*

A column of weakly basic, anion exchange resin (50 cc.; Dowex 3, mesh 20–50) was converted to the bromide form and washed repeatedly with a mixture containing 80% methanol and 20% water by volume. A solution of $(C_6H_5)_4P_2N_3H_4Cl$ (2.00 grams, 0.00442 mole) in 25 ml. of the methanol-water mixture was placed on the column and eluted with additional solvent. Concentration of 100 ml. of the eluent gave 1.42 grams of crude $(C_6H_5)_4P_2N_3H_4Br$. One recrystallization from methanol gave the analytical sample, M.P. 223.5–226.

*Analysis.*—Calcd. for $C_{24}H_{24}P_2N_3Br$: C, 58.08; H, 4.87; P, 12.48; N, 8.47; Br, 16.10. Found: C, 57.84; H, 5.06; P, 12.69; N, 8.55; Br, 16.45.

The compound formed in accordance with Example 1, on heating at 250°–300° C. for 2–4 hours, forms a mixture of cyclic phosponitriles of the formula $[(C_6H_5)_2PN]_n$ and ammonium chloride. The cyclic phosponitriles are readily extracted with benzene and yield primarily $[(C_6H_5)_2PN]_4$ as white, needle-like crystals on evaporation and cooling of the benzene solution.

We claim:
1. A compound of the formula:

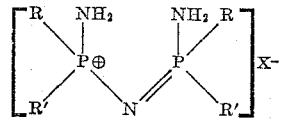

where X is an anion and R and R' are members selected from the class consisting of phenyl and a substituted phenyl of the formula

where Y is a member selected from the group consisting of methyl, methoxy, cyano, thiocyano, isothiocyano, dialkyl amine having no more than 4 carbon atoms in the alkyl groups, nitro and halogen and $n$ in an integer from 1 to 5.

2. A quasiphosphonium salt of the formula:

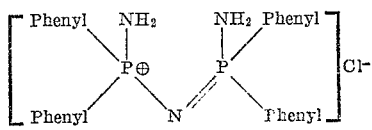

3. A quasiphosphonium salt of the formula:

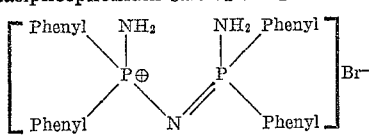

4. A quasiphosphonium salt of the formula:

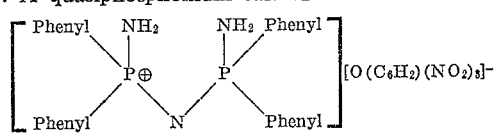

References Cited in the file of this patent

Haber et al.: J. Amer. Chem. Soc., vol. 80, pp. 2116–2117 (1958).